(12) United States Patent
Kreutzer et al.

(10) Patent No.: US 8,975,774 B2
(45) Date of Patent: Mar. 10, 2015

(54) HV-BATTERY, IN PARTICULAR TRACTION BATTERY FOR A VEHICLE

(75) Inventors: Christoph Kreutzer, Ingolstadt (DE); Heiner Fees, Bietigheim-Bissingen (DE); Heinz-Willi Vassen, Buxheim (DE); Robert Schwarzbauer, Inchenhofen (DE); Bardo Lang, Buxheim (DE); Armin Pöppel, Gaimersheim (DE); Karsten Büttner, Ingolstadt (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 14/116,612

(22) PCT Filed: May 11, 2012

(86) PCT No.: PCT/EP2012/002027
§ 371 (c)(1),
(2), (4) Date: Nov. 8, 2013

(87) PCT Pub. No.: WO2012/152444
PCT Pub. Date: Nov. 15, 2012

(65) Prior Publication Data
US 2014/0117754 A1 May 1, 2014

(30) Foreign Application Priority Data
May 12, 2011 (DE) .......................... 10 2011 101 352

(51) Int. Cl.
*H01M 10/42* (2006.01)
*H01M 2/02* (2006.01)
(Continued)

(52) U.S. Cl.
CPC .......... *H01M 10/425* (2013.01); *H01M 2/0245* (2013.01); *H01M 2/043* (2013.01);
(Continued)

(58) Field of Classification Search
USPC .......... 307/9.1, 10.1, 150; 429/96, 97, 98, 99, 429/100, 123, 159, 160, 61, 7
See application file for complete search history.

(56) References Cited

U.S. PATENT DOCUMENTS 7,859,844 B2 * 12/2010 Nguyen et al. ................. 361/697
2003/0211382 A1 * 11/2003 Aoyama ......................... 429/96
(Continued)

FOREIGN PATENT DOCUMENTS

DE 198 10 746 9/1999
DE 202010012151 12/2010
(Continued)

OTHER PUBLICATIONS

International Search Report issued by the European Patent Office in International Application PCT/EP2012/002027 on Oct. 10, 2012.

*Primary Examiner* — Jared Fureman
*Assistant Examiner* — Carlos LaGuerre
(74) *Attorney, Agent, or Firm* — Henry M. Feiereisen LLC

(57) ABSTRACT

The invention relates to a HV-battery, in particular a traction battery for a vehicle, having a plurality of cell modules which each comprise a plurality of cells, wherein each cell module is assigned a controller for cell monitoring and/or for cell balancing, wherein the controllers are connected to a battery management control device for communication or open-loop control and/or closed loop control purposes, wherein the HV-battery is of modular construction by configuring the cell modules as plug-in modules that are detachably mountable or can be mounted to a printed circuit board.

10 Claims, 3 Drawing Sheets

(51) Int. Cl.
*H01M 2/04* (2006.01)
*H01M 2/10* (2006.01)

(52) U.S. Cl.
CPC .......... *H01M2/1072* (2013.01); *H01M 2/1077* (2013.01); *H01M 10/4207* (2013.01); *H01M 2220/20* (2013.01); *H01M 2010/4271* (2013.01)
USPC ............... 307/10.1; 307/9.1; 307/150; 429/7; 429/61; 429/96; 429/97; 429/98; 429/99; 429/100; 429/123; 429/159; 429/160

(56) References Cited

U.S. PATENT DOCUMENTS

| | | | |
|---|---|---|---|
| 2005/0202315 A1* | 9/2005 | Sugeno et al. | 429/156 |
| 2005/0274556 A1* | 12/2005 | Chaney | 180/68.5 |
| 2007/0080662 A1* | 4/2007 | Wu | 320/110 |
| 2007/0087266 A1 | 4/2007 | Bourke et al. | |
| 2008/0042617 A1* | 2/2008 | Gamboa et al. | 320/107 |
| 2008/0280192 A1* | 11/2008 | Drozdz et al. | 429/62 |
| 2008/0305390 A1* | 12/2008 | Naito | 429/159 |
| 2009/0130541 A1 | 5/2009 | Emori et al. | |
| 2010/0073005 A1* | 3/2010 | Yano et al. | 324/427 |
| 2010/0112425 A1* | 5/2010 | Dunn | 429/99 |
| 2010/0167115 A1* | 7/2010 | Okada et al. | 429/99 |
| 2010/0320969 A1 | 12/2010 | Sakakibara et al. | |
| 2011/0151314 A1* | 6/2011 | Ogawa | 429/158 |
| 2011/0287300 A1* | 11/2011 | Byun et al. | 429/158 |
| 2011/0305948 A1* | 12/2011 | Miyatake et al. | 429/210 |
| 2012/0019061 A1* | 1/2012 | Nishihara et al. | 307/10.1 |
| 2012/0080938 A1* | 4/2012 | Rutkowski et al. | 307/9.1 |
| 2012/0115012 A1* | 5/2012 | Chen et al. | 429/159 |
| 2012/0319695 A1* | 12/2012 | Yano et al. | 324/427 |

FOREIGN PATENT DOCUMENTS

| | | | | |
|---|---|---|---|---|
| EP | 1 067 393 | 1/2001 | | |
| EP | 1 526 601 | 4/2005 | | |
| EP | 1 577 966 | 9/2005 | | |
| EP | 2 244 319 | 10/2010 | | |
| EP | 2 290 733 | 3/2011 | | |
| WO | WO 2010021293 A1 * | 2/2010 | | H01M 6/44 |
| WO | WO 2010103874 A1 * | 9/2010 | | H01M 10/50 |
| WO | WO 2010113455 A1 * | 10/2010 | | |

* cited by examiner

HV-BATTERY, IN PARTICULAR TRACTION BATTERY FOR A VEHICLE

CROSS-REFERENCES TO RELATED APPLICATIONS

This application is the U.S. National Stage of International Application No. PCT/EP2012/002027, filed May 11, 2012, which designated the United States and has been published as International Publication No. WO 2012/152444 and which claims the priority of German Patent Application, Serial No. 10 2011 101 352.4, filed May 12, 2011, pursuant to 35 U.S.C. 119(a)-(d),

BACKGROUND OF THE INVENTION

The invention relates to a HV-battery, in particular a traction battery for a vehicle, having several cell modules, each of which including several cells, with a control for cell monitoring and/or for cell balancing being associated to each cell module, with the controls being connected to a battery management control unit for communication and/or open-loop or closed-loop control purposes.

HV-batteries (high-voltage batteries) are used, e.g., as traction battery for hybrid vehicles. Metal hydride batteries or lithium-ion batteries are used as batteries. Single cells of the battery are connected in series so as to provide the voltage necessary for an electric motor.

EP 1 577 966 A2 discloses a modular traction battery having a plurality of individual battery cells. The individual battery cells can be stacked to provide a traction battery with a desired voltage and a desired capacity.

US 2007/0087266 A1 proposes a modular battery system having several battery modules which are connected in series. The state of battery modules is ascertained by a monitoring device.

US 2009/0130541 A1 discloses a battery comprised of many individual cells, with an integrated circuit being associated to each of the cells. This circuit is used as a controller for monitoring the cells, in addition, a communication module is provided to exchange information with other control devices. The controllers are mounted on the side of the cells.

A traction battery with a plurality of lithium-ion cells is known from EP 1 526 601 A1. The individual cells are combined into a module, a controller determines state values for each module and transfers them to a higher-level controller.

A special battery module is described in EP 2 244 319 A1. The battery includes a monitoring circuit for monitoring state parameters of individual cells. In addition, an interface for an external controller is provided.

Although some of the mentioned conventional HV-batteries are of modular construction, the presence of a central electronic module or a control (controller) is normally required so that the structure of the HV-battery is inflexible and prevents complete modularization.

SUMMARY OF THE INVENTION

The invention is therefore based on the object to provide a HV-battery, which is modular in construction and can be complemented in a flexible manner.

This object is achieved in accordance with the invention by a HV-battery of the afore-mentioned type, having cell modules which are designed as plug-in modules that are detachably mountable or mounted on a printed circuit board.

The configuration of the cell modules in accordance with the invention as plug-in modules permits their arrangement virtually anywhere on the printed circuit board, thereby affording a complete modularity. Different HV-batteries can be realized using a printed circuit board by mounting more or less cells modules on the printed circuit board. This individual mounting, tailored to the specific application, enables the realization of a battery with specified properties. In particular, the battery voltage, the current that can be supplied, and the capacitance can be determined or changed in this way. The HV-battery according to the invention even permits a later modification by increasing or decreasing the number of cell modules.

The HV-battery according to the invention receives the modularity by associating a control for cell monitoring and/or for cell balancing to each cell module so that the cell module together with the control can be attached or removed from the printed circuit board. Complex connection or other configuration works are eliminated since the cell module is firmly connected to the control.

Handling of the HV-battery according to the invention can be simplified by providing the cell modules or the printed circuit board with projections or latching elements which can be inserted into recesses of the other component. In this way, cell modules can be easily removed or added with little effort.

According to a further embodiment of the invention, the HV-battery can be provided with an outlet box or splitting box as a plug-in module having at least one of the following components: devices for HV distribution, contactors, a fuse, a precharge circuit, a current sensor. The outlet box or splitting box, also referred to as junction box, thus includes one or more electrical or electronic components, which can be used in the operation of HV-battery, at least optionally. In this context, it is particularly preferred that the outlet box or splitting box has the same size and/or the same contact spacing as the cells modules. When the junction box has the same size as a cell module, mounting becomes especially easy.

According to another embodiment of the invention, arrangement of several battery management control units can be provided on a mounting (lead frame) or a frame. In this way, several battery management control units can be easily connected or removed. In terms of site of attachment, it is preferred to attach the mounting or the frame on the side of the cell modules opposite to the printed circuit board.

The mounting (lead frame) serves simultaneously as downholder and retains the individual cell modules on the printed circuit board. The lead frame includes contacts and connecting lines for contacting the cell modules, at its ends, it has connections to connect e.g. several lead frames with one another.

In addition, the invention relates to a motor vehicle. The motor vehicle according to the invention is characterized in that it includes a HV-battery of the afore-described type.

BRIEF DESCRIPTION OF THE DRAWING

Further advantages and details of the invention will be explained based on an exemplified embodiment with reference to the drawings. The drawings are schematic illustrations and show.

DETAILED DESCRIPTION OF PREFERRED EMBODIMENTS

Figure 1:
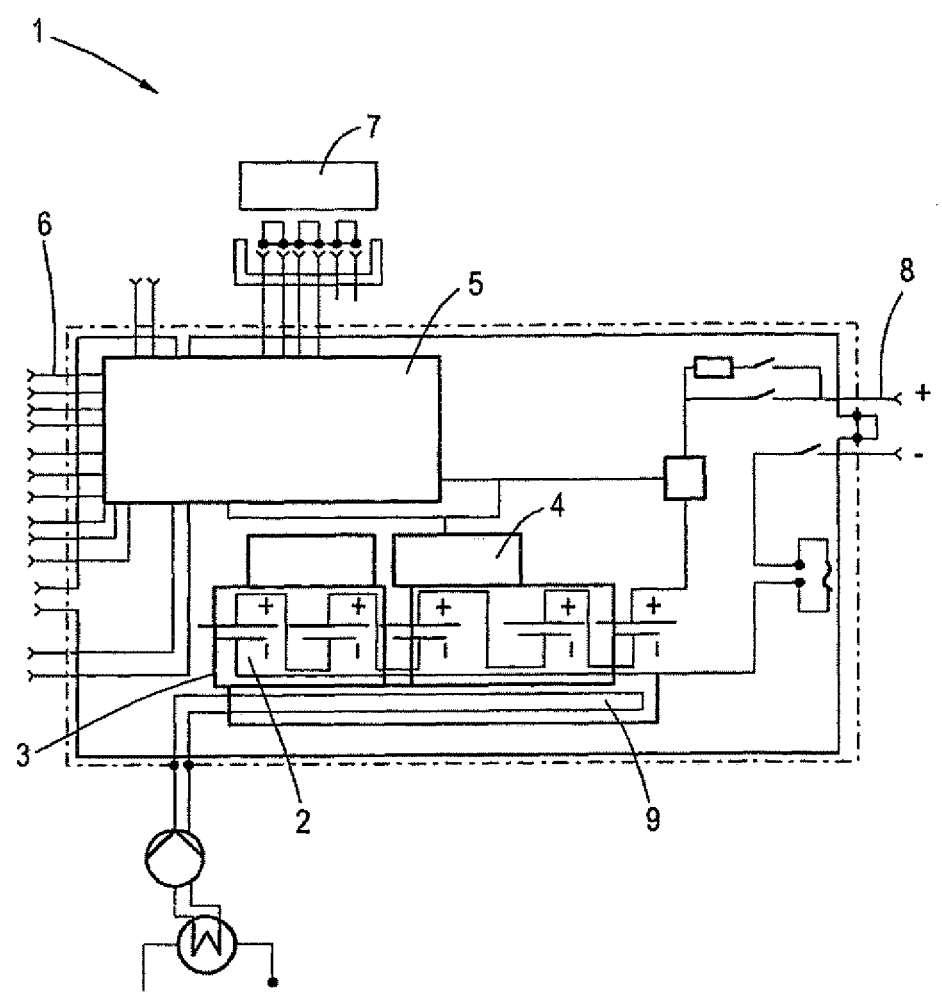
FIG. 1 a circuit diagram of a HV-battery according to the invention.

The diagram shown in FIG. 1 of a HV-battery 1 shows its essential components. The HV-battery 1 is comprised of a plurality of cells 2 that are connected in series. Several cells 2 are combined to form a cell module 3. In the exemplified embodiment shown in FIG. 1, each cell module 3 has two cells 2. However, configurations are also possible in which each cell module 3 has e.g. three, four or five cells.

Each cell module 3 has associated thereto a control 4 for cell monitoring and cell balancing. Cell balancing ensures that the individual cells 2 of a cell module 3 can be discharged at least approximately uniformly, thereby increasing their service life.

The individual controls 4 are connected to a master battery management control unit 5 which has communication terminals 6 to exchange information with external controllers of a vehicle. Furthermore, the battery management control unit 5 can be switched off by an external switch 7 to shut down the HV-battery 1, for example for maintenance or repair purposes.

In addition, the NV-battery 1 has an output 8 which is connected to an electric motor and other electrically powered components of a vehicle. Integrated in the NV-battery 1 is a coolant channel 9 so as to be able to maintain the cells 2 at a moderate temperature.

Figure 2:
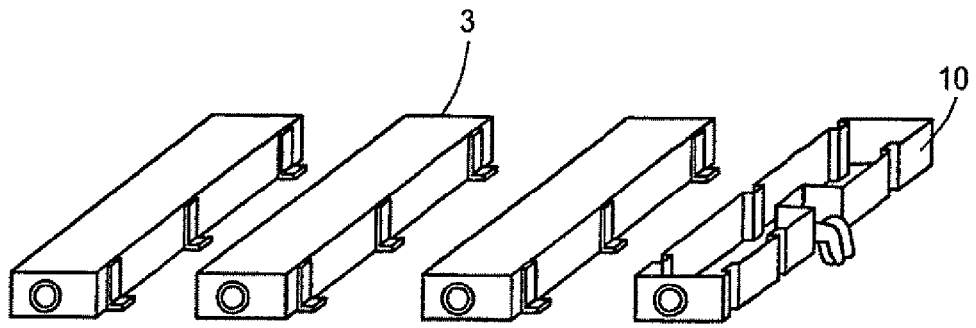
FIG. 2 a perspective view of individual cell modules.

FIG. 2 shows a perspective view of several cell modules. In the illustrated exemplified embodiment, three cell modules 3 are provided, each having a block-like housing. Each cell module includes several cells. In addition, FIG. 2 shows an outlet box (junction box) 10 which is provided for NV-distribution.

Figure 3:
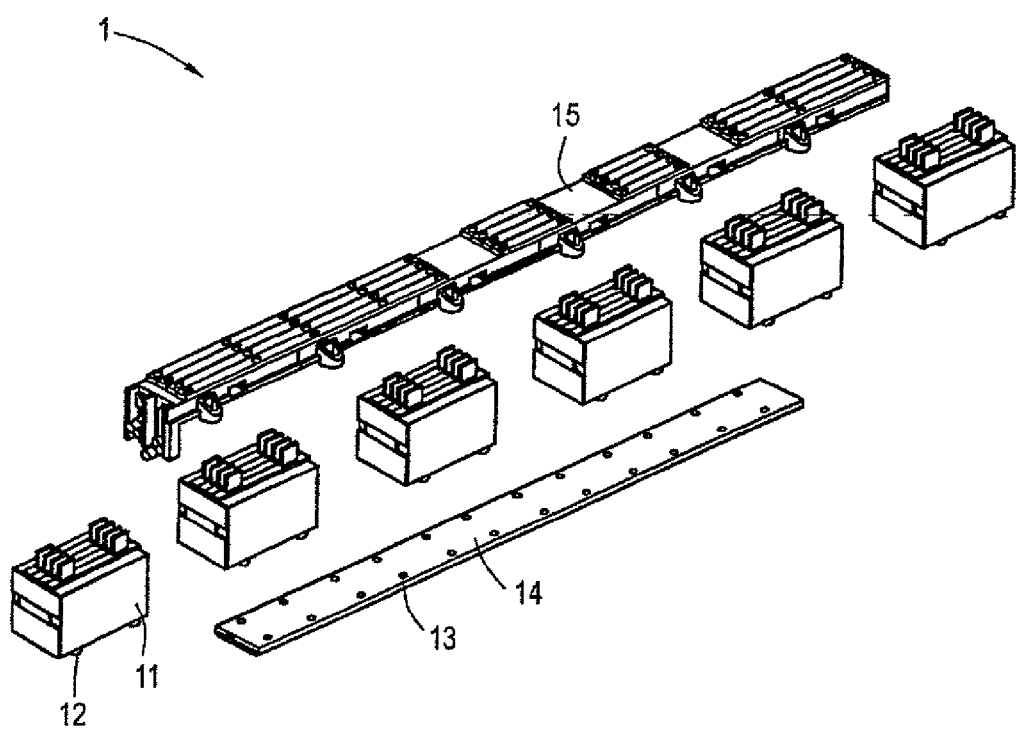
FIG. 3 a perspective view of the essential components of a HV-battery according to the invention, and FIG. 4 a perspective view of a HV-battery according to the invention.
Figure 4:
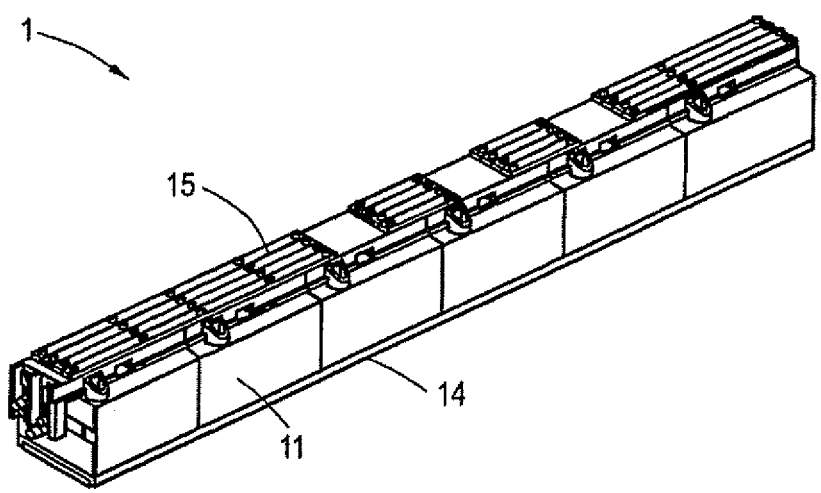

FIG. 3 shows a perspective view of the essential components of the HV-battery 1, FIG. 4 shows the same HV-battery 1 in the assembled state. The individual cell modules 11 have at their bottom side latching projections 12 which can be inserted in recesses 13 of a printed circuit board 14. In this way, several cell modules 11 can be stacked to thereby provide the desired modular design of the HV-battery 1. The battery 1 further includes a frame (lead frame) 15 for arrangement of several battery management control units 5. When assembled, the frame 15 is disposed on the side cell modules 1 opposite to the printed circuit board 14.

As can be seen from the drawings, the cell modules 3 are assembled to be located side-by-side with one another as considered in a longitudinal direction, and form two joint surfaces which are spaced from one another in a transverse direction, namely an upper joint surface and a lower joint surface. The lower joint surface of the cell modules 3 is fully covered by the printed circuit board 14, while the upper joint surface of the cell modules 3 is fully covered by the frame 15. The printed circuit board 14, the cell modules 3, and the frame 15 have substantially the same widths and lengths, as shown in particular in FIGS. 3 and 4.

The invention claimed is:

1. A HV-battery, comprising:
   a printed circuit board;
   a plurality of cell modules configured as plug-in modules for detachable securement to the printed circuit board so as to establish a modular configuration of the NV-battery, each of the cell modules including plural cells;
   a plurality of controls, operably connected to the cell modules in one-to-one correspondence, for cell monitoring or cell balancing;
   a battery management control unit, connected to the plurality of controls, for communication or open-loop or closed-loop control purposes;
   a frame for arrangement of the management control unit, wherein one member selected from the group consisting of the cell modules and the printed circuit board has projections or latching elements for engagement in recesses of the other member of the group,
   wherein the cell modules are arranged side-by-side in a longitudinal direction and have a joint upper surface and a joint lower surface spaced from one another in a transverse direction, said joint lower surface of the cell modules being fully covered by the printed circuit board, and said joint upper surface of the cell modules being fully covered by the frame.

2. The HV-battery of claim 1, configured for use as a traction battery of a vehicle.

3. The HV-battery of claim 1, further comprising an outlet box or splitting box in the form of a plug-in module which includes at least one component selected from the group consisting of device for HV distribution, contactor, fuse, precharge circuit, and current sensor.

4. The HV-battery of claim 1, wherein the cell modules in the assembled state, the printed circuit board, and the frame have substantially a same width and length.

5. The HV-battery of claim 3, wherein the outlet box or splitting box has a same size or a same contact spacing as the cells modules.

6. A motor vehicle, comprising a HV-battery including a printed circuit board, a plurality of cell modules configured as plug-in modules for detachable securement to the printed circuit board so as to establish a modular configuration of the HV-battery, each of the cell modules including plural cells, a plurality of controls, operably connected to the cell modules in one-to-one correspondence, for cell monitoring or cell balancing, a battery management control unit, connected to the controls, for communication or open-loop or closed-loop control purposes, and a frame for arrangement of said management control unit, wherein one member selected from the group consisting of the cell modules and the printed circuit board has projections or latching elements for engagement in recesses of the other member of the group, wherein the cell modules are arranged side-by-side in a longitudinal direction and have a joint upper surface and a joint lower surface spaced from one another in a transverse direction, said joint lower surface of the cell modules being fully covered by the printed circuit board, and said joint upper surface of the cell modules being fully covered by the frame.

7. The motor vehicle of claim 6, wherein the HV-battery is configured for use as a traction battery.

8. The motor vehicle of claim 6, wherein the HV-battery includes an outlet box or splitting box in the form of a plug-in module which includes at least one component selected from the group consisting of device for HV distribution, contactor, fuse, precharge circuit, and current sensor.

9. The motor vehicle of claim 6, wherein the cell modules in the assembled state, the printed circuit board and the frame have substantially a same width and length.

10. The motor vehicle of claim 8, wherein the outlet box or splitting box has a same size or a same contact spacing as the cells modules.

* * * * *

UNITED STATES PATENT AND TRADEMARK OFFICE
CERTIFICATE OF CORRECTION

| | | |
|---|---|---|
| PATENT NO. | : 8,975,774 B2 | Page 1 of 1 |
| APPLICATION NO. | : 14/116612 | |
| DATED | : March 10, 2015 | |
| INVENTOR(S) | : Kreutzer et al. | |

It is certified that error appears in the above-identified patent and that said Letters Patent is hereby corrected as shown below:

In the Claims

In column 3, claim 1, line 5: please replace "NV-battery" with --HV-battery--.

Signed and Sealed this
Eighth Day of September, 2015

Michelle K. Lee
*Director of the United States Patent and Trademark Office*